(12) United States Patent  
Davidson et al.

(10) Patent No.: US 7,437,320 B2  
(45) Date of Patent: Oct. 14, 2008

(54) PROCESS FOR ORGANIZING BUSINESS AND OTHER CONTACTS FOR MULTIPLE USERS

(75) Inventors: David Peter Davidson, Osgathorpe (GB); Duncan Charles McCreadie, Mickleover (GB)

(73) Assignee: ContacTree Limited, Nottingham (GB)

( * ) Notice: Subject to any disclaimer, the term of this patent is extended or adjusted under 35 U.S.C. 154(b) by 265 days.

(21) Appl. No.: 10/966,334

(22) Filed: Oct. 15, 2004

(65) Prior Publication Data

US 2005/0131777 A1 Jun. 16, 2005

(30) Foreign Application Priority Data

| Oct. 15, 2003 | (GB) | ................................. | 0324141.1 |
| Feb. 16, 2004 | (GB) | ................................. | 0403306.4 |
| Jul. 22, 2004 | (GB) | ................................. | 0416356.4 |

(51) Int. Cl.  
*G06F 17/30* (2006.01)  
*G07F 7/00* (2006.01)

(52) U.S. Cl. ........................................ 705/27; 707/102

(58) Field of Classification Search ....................... None  
See application file for complete search history.

(56) References Cited

U.S. PATENT DOCUMENTS

| 6,269,369 | B1 * | 7/2001 | Robertson .................... 707/10 |
| 6,324,541 | B1 * | 11/2001 | de l'Etraz et al. ........ 707/104.1 |
| 6,747,651 | B1 * | 6/2004 | Tan et al. ..................... 345/474 |
| 6,883,000 | B1 * | 4/2005 | Gropper ....................... 707/10 |
| 2002/0049738 | A1 * | 4/2002 | Epstein ........................... 707/1 |
| 2002/0091667 | A1 * | 7/2002 | Jaipuria et al. ................. 707/1 |

FOREIGN PATENT DOCUMENTS

WO WO0184359 A2 * 11/2001

OTHER PUBLICATIONS

Carlos Jensen, John Davis, Shelly Farnham, "Finding Others Online: Reputation Systems for Social Online Spaces", CHI 2002, Apr. 20-25, 2002, vol. 4, Issue 1, ACM 1-58113-453-3-02-0004.*  
Glencoe McGraw-hill, http://www.glencoe.com/ps/computered/pas/printerFriendly.php4?articleld=413, The e-zine Approach, 2001 The McGraw-Hill Companies, Inc.*

* cited by examiner

*Primary Examiner*—Hosain T Alam  
*Assistant Examiner*—Van H Ngo  
(74) *Attorney, Agent, or Firm*—Kilyk & Bowersox, P.L.L.C.

(57) ABSTRACT

A method is provided that can include providing a computer, storing data records in the data store, processing the data records to form a hierarchical chart that reflects a relationship field and displaying the hierarchical chart on the display device. Each data record can include an identifier field, a relationship field, and a quality assurance field, where the relationship field for at least one of the data records defines a hierarchical relationship with at least one of the other of the data records. The computer can include a processing device, a display device, a storage device, and a data store. A computer program and system are also provided.

19 Claims, 12 Drawing Sheets

| JOB TITLE | E-MAIL | MANAGER'S NAME | REPOR... | REFERR... |
|---|---|---|---|---|
| | | | 0 | |
| | HELEN.WORSFOLD@ABBEYNATION... | | 0 | PW03 |
| | | ABBEY NATIONAL | | |
| | | ABBEY NATIONAL | | |
| | | ABBEY NATIONAL | | |
| PROJECT MANAGER | PETER.MAYO-SMITH@ABBEYNATI... | TONY TEAGUE | 0 | |
| DIRECTOR GP PROGS | TONY.TEAGUE@ABBEYNATIONAL... | STEPHEN HESTOR | 0 | |
| IRELAND | SEAMUS.MCCOLLUM@ABBEYNATI... | TONY TEAGUE | 0 | 05/06/... |
| GROUP FINANCE DI... | STEVE.HESTOR@ABBEYNATIONAL... | LUGMAN ARNOLD | 0 | 05/06/... |
| DIRECTOR | ?.@ABBEYNATIONAL.CO.UK | LUGMAN ARNOLD | 0 | 05/06/... |
| DIRECTOR | PROPOSITIONS.@ABBEYNATIONAL... | LUGMAN ARNOLD | 0 | 05/06/... |
| DIRECTOR | OPERATIONS.@ABBEYNATIONAL.C... | LUGMAN ARNOLD | 0 | 05/06/... |
| EXCO SALES | PAUL.CHANG@ABBEYNATIONAL.C... | EXCO | 0 | 05/06/... |
| EXCO PROPOSITIONS | NICK.NORTON@ABBEYNATIONAL.C... | EXCO | 0 | 05/06/... |
| EXCO OPERATIONS | KENNY.WILSON@ABBEYNATIONAL... | EXCO | 0 | 05/06/... |
| CHANGE PROGRAMME | EXCO.@ABBEYNATIONAL.CO.UK | TONY TEAGUE | 0 | |

308 — 310 MANAGER — 312 TELEPHONE — 314 REFERRED BY

| E-MAIL | MANAGER'S NAME | REPORTEES | REFERRE... |
|---|---|---|---|
| ADAVIDSON@DARNAY.CO.UK | D.P. DAVIDSON | 0 | DUNCAN |
| FNAME.SNAME@ABBEYNATIONAL.CO.UK | ABBEY NATIONAL | | |
| | ABBEY NATIONAL | | |
| | | | |
| | ABBEY NATIONAL | | |

TYPE A QUESTION FOR HELP 404 402

TYPE A QUESTION FOR HELP

TYPE A QUESTION FOR HELP

| ALL FIELDS | | |
|---|---|---|
| BUSINESS | ▽ | 0115 2245 67 |
| HOME | ▽ | |
| BUSINESS FAX | ▽ | |
| MOBILE | ▽ | |
| E-MAIL | ▽ | JIM.SMITH@ABBEYNATIONAL.CO.UK |

PERSONAL HOME PAGE:

FILE AS: SMITH, JIM

START DATE: 09/01/2003

ASSISTANT'S NAME:

REPORTEES: 0

REFERRED BY: JAMES

PHOTO FILE

FIG. 4B

| NAME | EMAIL |
|---|---|
| 249 OTHERS | |
| 349 OTHERS | |
| ABBEY NATIONAL | |
| ABBEY NATIONAL (... | |
| ABBEY NATIONAL (... | |
| ABBEY NATIONAL (... | |
| ABBEY NATIONAL (... | |
| BUSINESS | |
| EDDIE TAST | |
| EXCO | EXCO@ABBEYN... |
| FRED BLOGGS | |
| HELEN WORSFOLD | HELEN.WORSFOLD... |
| IAN HARLEY | IAN.HARLEY@ABB... |
| IT | |
| IT PROJECT | |
| KENNY WILSON | KENNY.WILSON@A... |
| LUGMAN ARNOLD | LUGMAN.ARNOLD... |
| MARK JUDD | |
| NICK HORTON | NICK.HORTON@AB... |

EXPO DATE: 01/07/2003    COMPANY:              ☐ LOCKED

☑ CREATE OPPORTUNITY

TELEPHONE    MOBILE    TYPE    PRIORITY

POST CODE    REPORTS TO    OWNER

| E-MAIL | MANAGER'S NAME | REPORTEES | REFERRE... |
|---|---|---|---|
| ADAVIDSON@DARNAY.CO.UK | D.P. DAVIDSON | 0 | DURATION |
| | ABBEY NATIONAL P/C | | |
| | ABBEY NATIONAL | | |

|  |  |  | ▭ ◰ ✕ | ← 700 |
|---|---|---|---|---|

TYPE A QUESTION FOR HELP ▽

| BUSINESS | ▽ | 012304560789 |
| HOME | ▽ | |
| BUSINESS FAX | ▽ | |
| MOBILE | ▽ | |
| E-MAIL | ▽ | TONY.BLAIR@NUMBERTEN.COM |

PERSONAL HOME PAGE:

FILE AS: BLAIR, TONY ▽

START DATE: 03/10/2003 ▽            720

[ASSISTANT]  JOHN PRESCOTT ▽

REPORTEES: 20

REFERENCE:                            724

[KEY CONTACT]

CREATED:  722   MON 10/11/2003 21:10

[PHOTO FILE]

PROCESS FOR ORGANIZING BUSINESS AND OTHER CONTACTS FOR MULTIPLE USERS

CROSS REFERENCE TO RELATED APPLICATIONS

The present application claims a benefit of Great Britain Application No. 0324141.1 filed Oct. 15, 2003, Great Britain Application No. 0403306.4 filed Feb. 16, 2004, and Great Britain Application No. 0416356.4 filed Jul. 22, 2004, all of which are herein incorporated in their entireties by reference.

FIELD

The teachings of the present application relate to a process for organizing business and other contacts useful to chart business relationships in single and multiple-user situations. The chart can be used to develop the contacts and develop an understanding of the relationships amongst the contacts. Alternatively or additionally, the teachings can be used to chart hierarchical relationships between data records containing information other than contact information, for example, a functional organization of a workflow process or a corpus of technical knowledge.

SUMMARY

According to various embodiments, a method is provided that can include providing a computer, storing data records in the data store, processing the data records to form a hierarchical chart that reflects a relationship field and displaying the hierarchical chart on the display device. Each data record can include an identifier field, a relationship field, and a quality assurance field, where the relationship field for at least one of the data records defines a hierarchical relationship with at least one of the other of the data records. The computer can include a processing device, a display device, a storage device, and a data store.

According to various embodiments, a computer program is provided comprising: a data store manager adapted to manage data records, each data record including a plurality of fields, an identifier field, a relationship field, and a quality assurance field, where the relationship field for at least one of the data records defines a hierarchical relationship with at least one of the other of the data records; a hierarchical chart processing module to process the data records to form a hierarchical chart that reflects the relationship field; a display module capable of displaying the hierarchical chart on a display device; and an input module adapted to accept a value for one field of the plurality of fields, and predicting values for one or more of other fields of the plurality of fields based on the value of the one field.

According to various embodiments, a system is provided. The system can comprise: a computer including a processing device, a display device, a storage device, and an input device; a database manager adapted to store data records on the storage device, each data record can include a plurality of fields, an identifier field, a relationship field, and a quality assurance field, wherein the relationship field for at least one of the data records can define a hierarchical relationship with at least one of the other of the data records; and a contact manager including a hierarchical chart processing module to process the data records to form a hierarchical chart that reflects the relationship field, a display module capable of displaying the hierarchical chart on the display device, and an input module adapted to accept a value for a first field of the plurality of fields, and predict values for one or more other fields of the plurality of fields, based on the value of the first field. The system can further comprise a printer that can be capable of printing the hierarchical chart.

Additional features and advantages of the present teachings will be set forth in part in the description that follows, and in part will be apparent from the description, or can be learned by practice of the present teachings. The objectives and other advantages of the present teachings will be realized and attained by means of the elements and combinations particularly pointed out in the description and appended claims.

BRIEF DESCRIPTION OF THE DRAWINGS

Various embodiments of the present teachings are exemplified in the accompanying drawings. The teachings are not limited to the embodiments depicted in the drawings, and include equivalent structures and methods as set forth in the following description and as would be known to those of ordinary skill in the art in view of the present teachings. In the drawings:

FIGS. 3A-3B illustrate an abbreviated input form, for example, to input separate different related pieces of information;

FIGs. 4A-4B illustrate exemplary forms that can be used to create a set of individually linked records for a set of separate different related pieces of information;

FIGS. 5A-5B illustrate a OrgChart that can be created, together with an abbreviated input form, for example, that can be used to quickly enter different pieces of information;

FIGS. 7A-7B are an embodiment of displaying fields and TickTac-Box™ inserts disposed adjacent to some fields.

Figure 1:
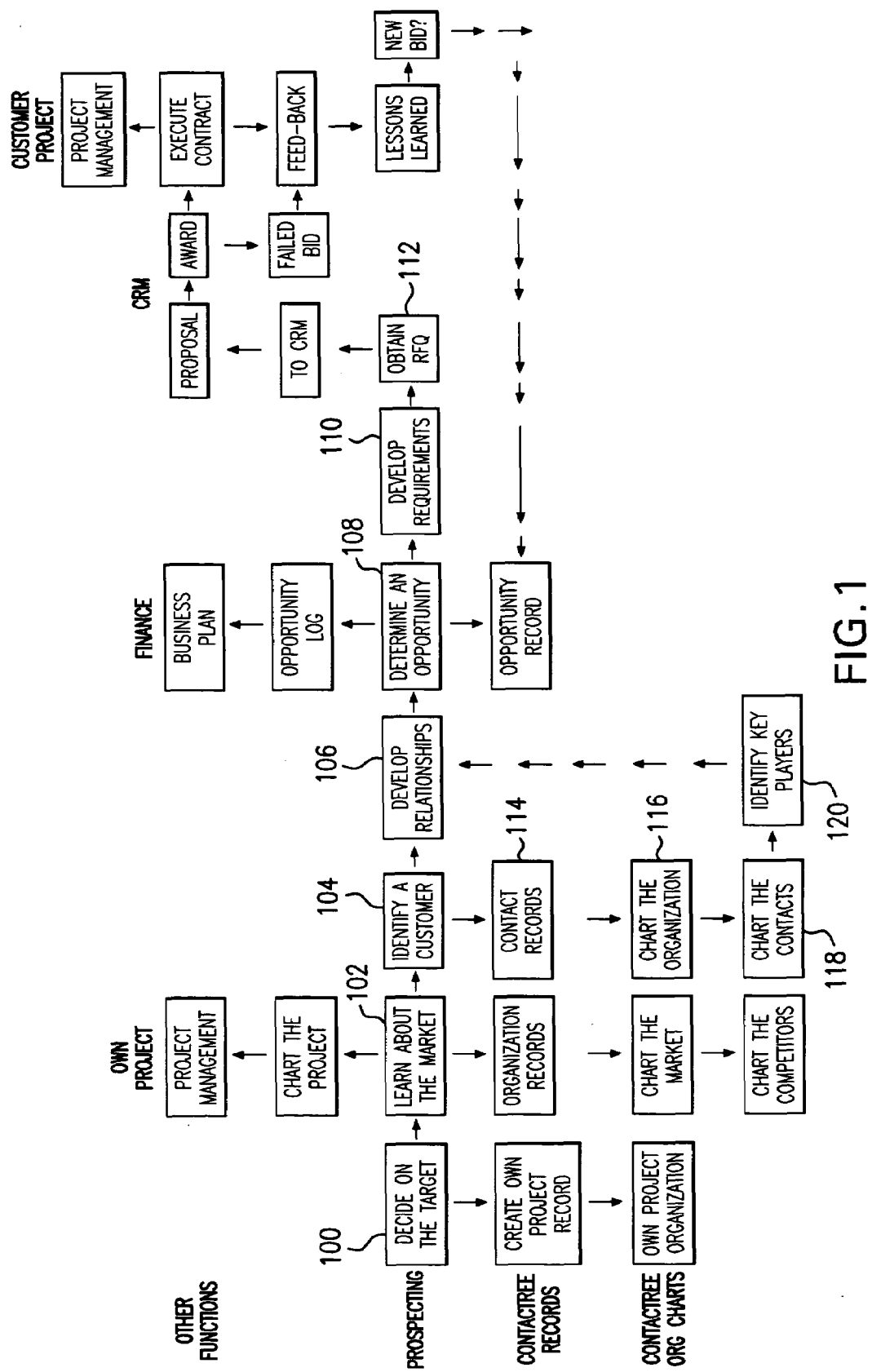
FIG. 1 illustrates how, for example, one or more members of an organization's sales team can collect information about members of a prospective client's organization and can generate one or more organization charts to assist a sales process.

It is to be understood that both the foregoing general description and the following detailed description are exemplary and explanatory only and are intended to provide a further explanation of the various embodiments of the present teachings.

DESCRIPTION

The teachings relates to a process for the use of a set of information concerning contacts useful to prosecuting business relationships in single and multiple-user situations. Each record is provided with information relating it to the contact immediately superior in a hierarchic organization such as a company. This information can be used to deduce the unique set of relationships between the contacts and to display this as a branched chart of the organization. A set of pre-defined data entry tables that enable the teachings to be executed in a time-effective manner is described. The information contained in the charts can be used in the method to identify relationships that are of particular importance to the user, perhaps with contacts who are still to be sought out. Links inherent in the charts can be used to open the sets of data used to create the charts. Methods of combining information are described where different users have different information about any one of their contacts. The methods of combining information from different users can be applicable to any Knowledge-Management system. The teachings provide a structured process for the development of a system for knowledge management. The teachings can be used for Market Prospecting or managing of business relationships.

In contrast to organization charting processes known in the art, that normally start the sorting and charting process from the top-down, the teachings of the present application can commence with a contact anywhere in an organization structure. The structure can be built upwards, downwards, or laterally by recording a contact's supervisor and/or subordinate. This method can equally be applied to organize a hierarchy of groups. The groups can include information, for example, organization, companies, or other datasets amenable to a hierarchical structure.

The term "Contact" as used herein refers to an individual person with whom an individual, a group of individuals, or business unit has a relationship. The contact record stores all information about a person such as an e-mail address, street address, multiple phone numbers, and any other information that relates to the contact, such as birthday or anniversary date. Methods can recognize defined relationships between contacts and can automatically create and display organization charts. The contacts can be staff of the business unit itself.

The term "Organization" as used herein refers to a number of contacts, or of other organizations. The organization record can be used to define those elements of address and responsibility that are common to all contacts within it. The organization can be a customer, a supplier, a competitor, a partner, an assemblage of other organizations, such as a trade association, or the holding company for a group of companies, or even something as nebulous as a market sector.

The term "Parent" as used herein refers to a formal or arbitrary assignment of a contact to another supervisor contact or organization, or of one subsidiary organization to a parent organization. Entries into a Parent field can be used to generate hierarchical charts of groups of organizations.

The term "Program" as used herein refers to an ad-hoc grouping of organizations that combine to execute large or complex activities. Contacts can be associated with a number of programs as well as with their home organization, and can be in different hierarchic relationships between them.

The term "Opportunity" as used herein refers to a chance to do business with another Organization or Program. Salespeople can use opportunities to keep track of each sales engagement on that they are currently working. A user can track things like what stage, introduction, qualification, needs identification, proposal generation, and so on; an opportunity is in, the revenue potential, the probability of closing the deal, and the orders that can be generated.

The term "lead" as used herein refers to a key Contact in an Opportunity.

The term "Activities" as used herein refers to tasks a user performs when contacting customers, for example, sending letters or making telephone calls. An activity can be thought of as any action for which an entry can be made on a calendar. An activity has time dimensions, start time, stop time, due date, duration, that can help identify when the action occurred or is to occur.

The term "Project" as used herein refers to a collection of activities or tasks that constitute a coherent time-based progression of business change or objective achievement.

According to various embodiments, a method is provided that can include providing a computer, storing data records in the data store, processing the data records to form a hierarchical chart that reflects a relationship field and displaying the hierarchical chart on the display device. Each data record can include an identifier field, a relationship field, and a quality assurance field, where the relationship field for at least one of the data records defines a hierarchical relationship with at least one of the other of the data records. The computer can include a processing device, a display device, a storage device, and a data store.

The data records can comprise a plurality of data records each including an identical value for the respective identifier field, and can process the data records to select from the plurality of data records a data record that includes a user-defined value in the respective quality assurance field of each data record. The hierarchical chart processing module can comprise a step of calculating from the plurality of data records a combination value for the respective quality assurance fields of each data record. The organization chart can comprise boxes and one or more connectors to display the hierarchy of the boxes. Each box can include a respective value. The processing step can define a graphic attribute of at least one of the boxes based on the combination value.

According to various embodiments, the processing step can display the respective data record in response to a user selection of any one of the boxes. The method can provide for defining a graphic attribute of at least one of the boxes based on the respective quality assurance field of the respective data record to visually impart a desired classification criterion to the organization chart. The method can provide for defining a graphic attribute of at least one of the one or more connectors based on the respective quality assurance field of the respective data record to visually impart a desired classification criterion to the organization chart. The desired classification criterion can comprise at least one of a quality assurance level, data staleness, a placement in the organization chart of the respective box, a source of the respective box, or a combination thereof. The method can provide for defining a graphic attribute of at least one of the boxes based on the quality assurance field, wherein the quality assurance field comprises a user-defined subjective value. The graphic attribute can comprise at least one of a box background characteristic, a box background color, a box background texture, a box border line characteristic, a box border line thickness, a box border line dash pattern, a color for text displayed in the box, or a font characteristic for the text displayed in the box.

According to various embodiments, the method can provide for selecting data records wherein the respective quality assurance filed for each selected data record can meet a desired criterion. The desired criterion can comprise at least one of quality assurance, data staleness, placement in the organization chart, a source of the respective data record, or a combination thereof.

The quality assurance field can comprise a data record modification timestamp. The quality assurance field can comprise a multi-dimensional value. The quality assurance field can comprise a user-defined subjective value. The data record can comprise a contact data record. The relationship field can record a relationship between a contact supervisor and a contact subordinate. The relationship field can record a relationship between a primary designation and a secondary designation. The relationship field for each data record can comprise a plurality of relationship fields. The quality assurance field for each data record can comprise a plurality of quality assurance field fields.

According to various embodiments, the data store can comprise a plurality of data stores and the method can provide for combining the data stores. The method can provide for selecting a data record from the data records and traversing the relationship field of each data record to compute hierarchy above and below the selected data record. The method can provide for a highlighting the selected data record in the hierarchical chart in order to connect with associated data. The method can provide for performing a social network analysis on the data records based on a value of the respective relationship field of each data record.

According to various embodiments, the computer can further comprise an input device. The data record can comprise a plurality of fields and the method can provide for an inputting of a value for one field of the plurality of fields, and predicting values for one or more other fields of the plurality of fields based on the value of the one field. The computer can comprise a printer, and the method can further comprise printing an organizational chart.

According to various embodiments, a computer program is provided comprising: a data store manager adapted to manage data records, each data record including a plurality of fields, an identifier field, a relationship field, and a quality assurance field, where the relationship field for at least one of the data records defines a hierarchical relationship with at least one of the other of the data records; a hierarchical chart processing modules to process the data records to form a hierarchical chart that reflects the relationship field; a display module capable of displaying the hierarchical chart on a display device; and an input module adapted to accept a value for one field of the plurality of fields, and predicting values for one or more of other fields of the plurality of fields based on the value of the one field.

According to various embodiments, a system is provided. The system can comprise: a computer including a processing device, a display device, a storage device, and an input device; a database manager adapted to store data records on the storage device, each data record can include a plurality of fields, an identifier field, a relationship field, and a quality assurance field, wherein the relationship field for at least one of the data records can define a hierarchical relationship with at least one of the other of the data records; and a contact manager including a hierarchical chart processing module to process the data records to form a hierarchical chart that reflects the relationship field, a display module capable of displaying the hierarchical chart on the display device, and an input module adapted to accept a value for a first field of the plurality of fields, and predict values for one or more other fields of the plurality of fields, based on the value of the first field. The system can further comprise a printer that can be adapted to print the hierarchical chart.

FIG. 1 illustrates how, for example, one or more members of an organization's sales team can collect information about the members of a prospective client's organization. The information collected can be used to generate one or more organization charts to assist a sales process. FIG. 1 places the teachings of the present application in, for example, a sales management process. The customer relationship management (CRM) process taught herein can be used to decide on a target 100, learn about the market 102, identify a customer 104, develop relationships 106, determine an opportunity 108, develop requirements 110, and obtain a Request For a Quotation (RFQ) 112. The RFQ can also be known as a request for a proposal or a request for a bid. Once a customer has been identified, contact records 114 can be created. At any desired time after creating contact records, a chart of the organization 116 and/or a chart of the contacts 118 can be created, both of which can be used to identify key players 120.

Figure 2:
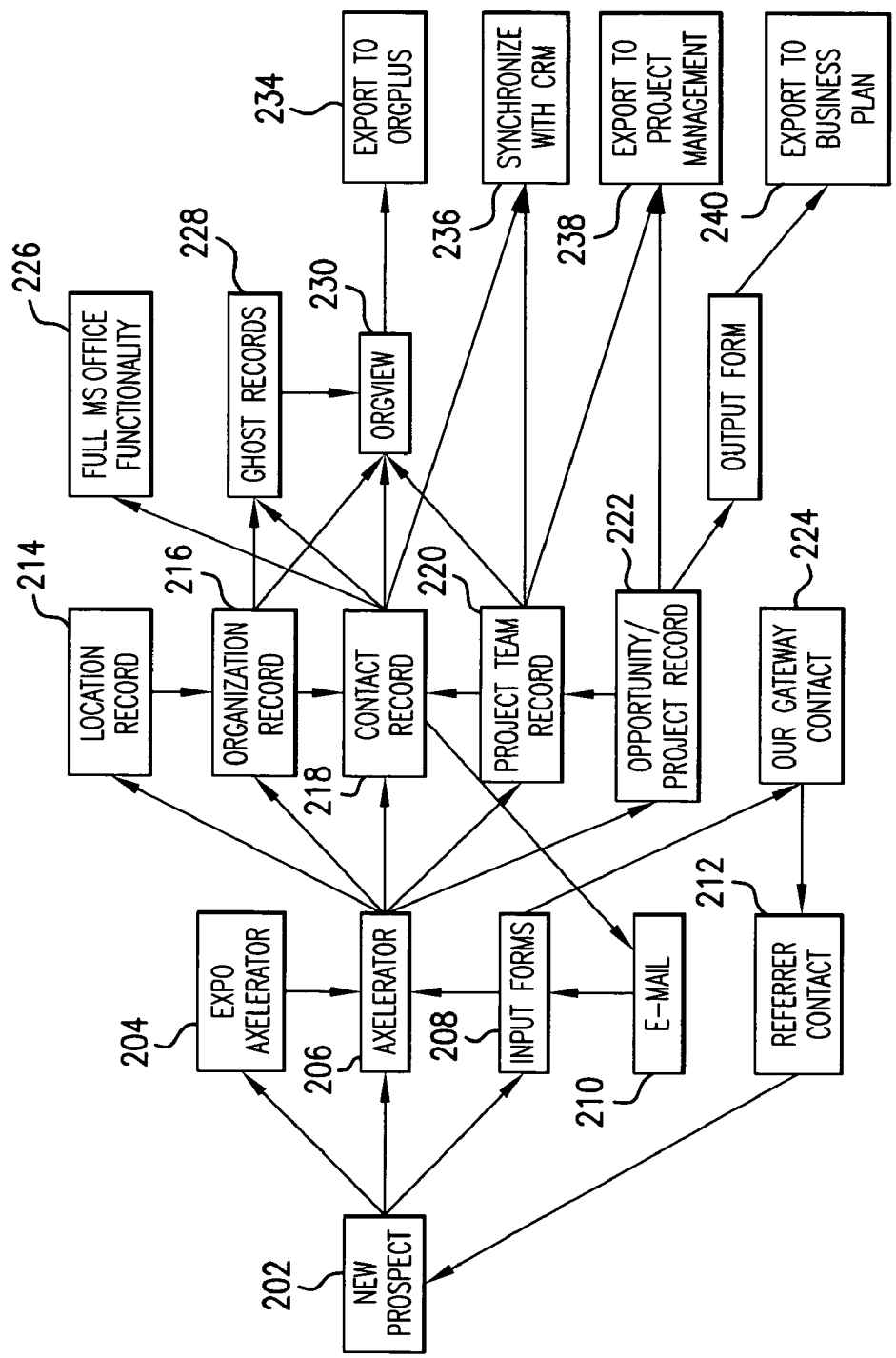
FIG. 2 illustrates software modules that can be employed to implement the method.

FIG. 2 shows an organization of software modules that can be used to implement the teachings of the present application. The teachings can be integrated into existing contact management software 226, for example, Microsoft Outlook available from Microsoft Corporation of Redmond, Wash. Full functionality of the contact management software 226 can be available, including a contact database for storage and manipulation of data records created by the method of the present teachings. Various data input modules can be used to enter data records for a new prospect 202 into the contact database. An Axelerator™ module 206, an Expo or other special Axelerator™ module 204, and any type of input form module 208 can be used to enter contact data. Data records for a referral contact 212, a location record 214, an organization record 216, a contact record 218, a project team record 220, an opportunity contact record 222, and/or a gateway contact record 224 can be created in the contact database. The various types of records can be time stamped so that as contact and organization information evolves, various types of ghost records 228 can be placed in the contact database for different versions of the contact and organization information.

According to various embodiments, data input fields provided by a third-party contact management system such as Microsoft Office or Microsoft Outlook 226 can be available in the various types of records. The third party software can provide an e-mail module 210. Charts depicting an organization view or OrgView 230 can be generated from a plurality of contact records 218 and/or a plurality of ghost records 228. The various types of records can be available to other modules, for example, an export to a third-party software such as OrgPlus module 234, a synchronize with a third-party CRM module 236, an export to project management module 238, an export to a business plan module 240, or a combination thereof. OrgPlus and OrgViewer software is available from HumanConcepts Inc. of Sausalito Calif.

Figure 3A:
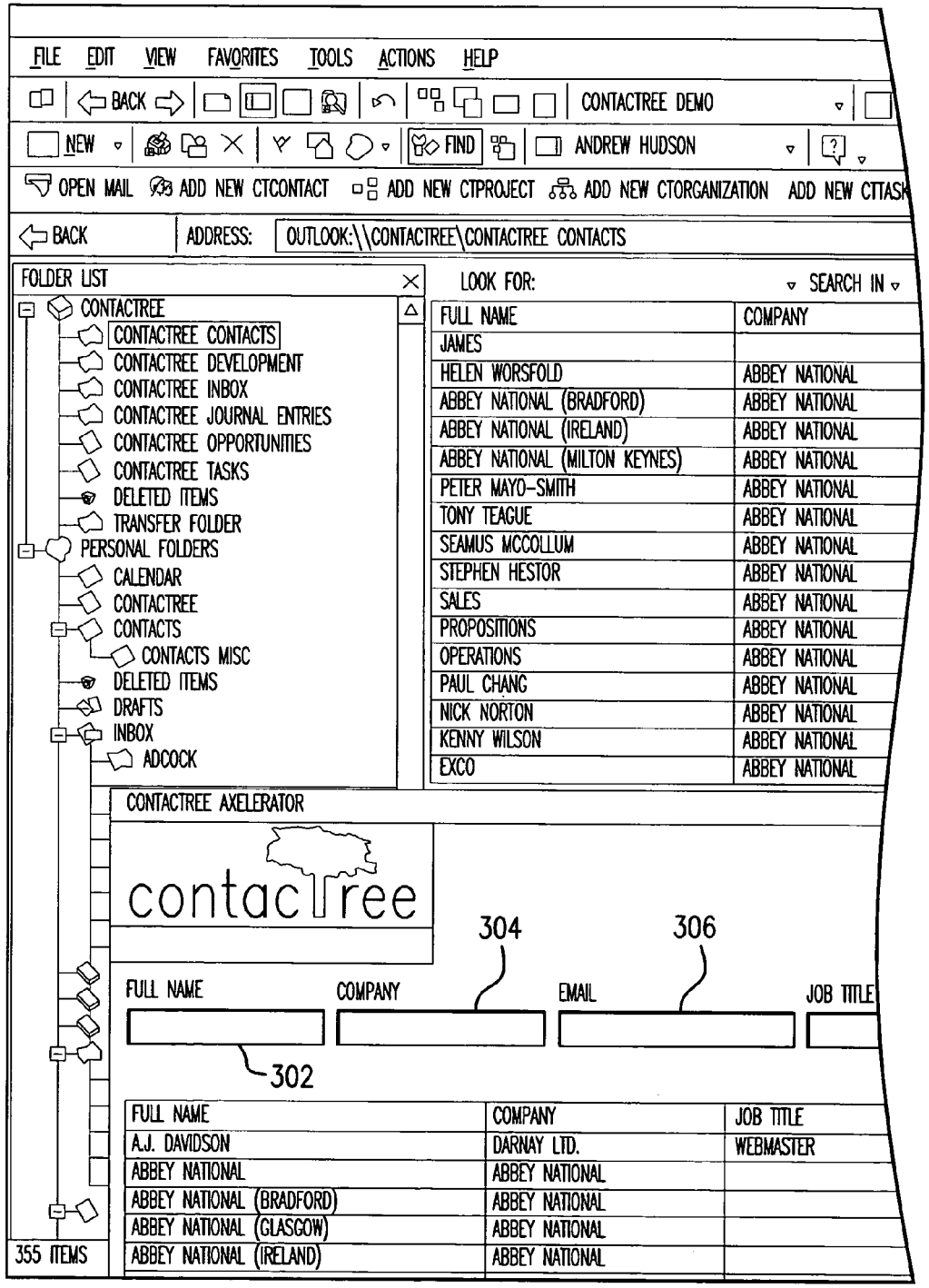

FIGS. 3A-3B illustrate an accelerated input form. Axelerator™ window 300 that can be used to quickly enter and display separate different related pieces of information. The Axelerator™ 300 can be used to enter field values for full name 302, company 304, e-mail 306, job title 308, manager 310, telephone 312, and referred by 314, for example. All of the above-listed fields can be auto-completed and auto-filled by the software as the user begins to type into the entry. Entry of a contact data can be accelerated. The functionality available in the third-party contact management system, for example Outlook, displaying a list of contacts in a tabular format in window 320, can be used with the present teachings. An Axelerator™ module associated with the Axelerator™ window 300 can create individual records for a company and/or a manager if those records do not exist.

Figure 4A:
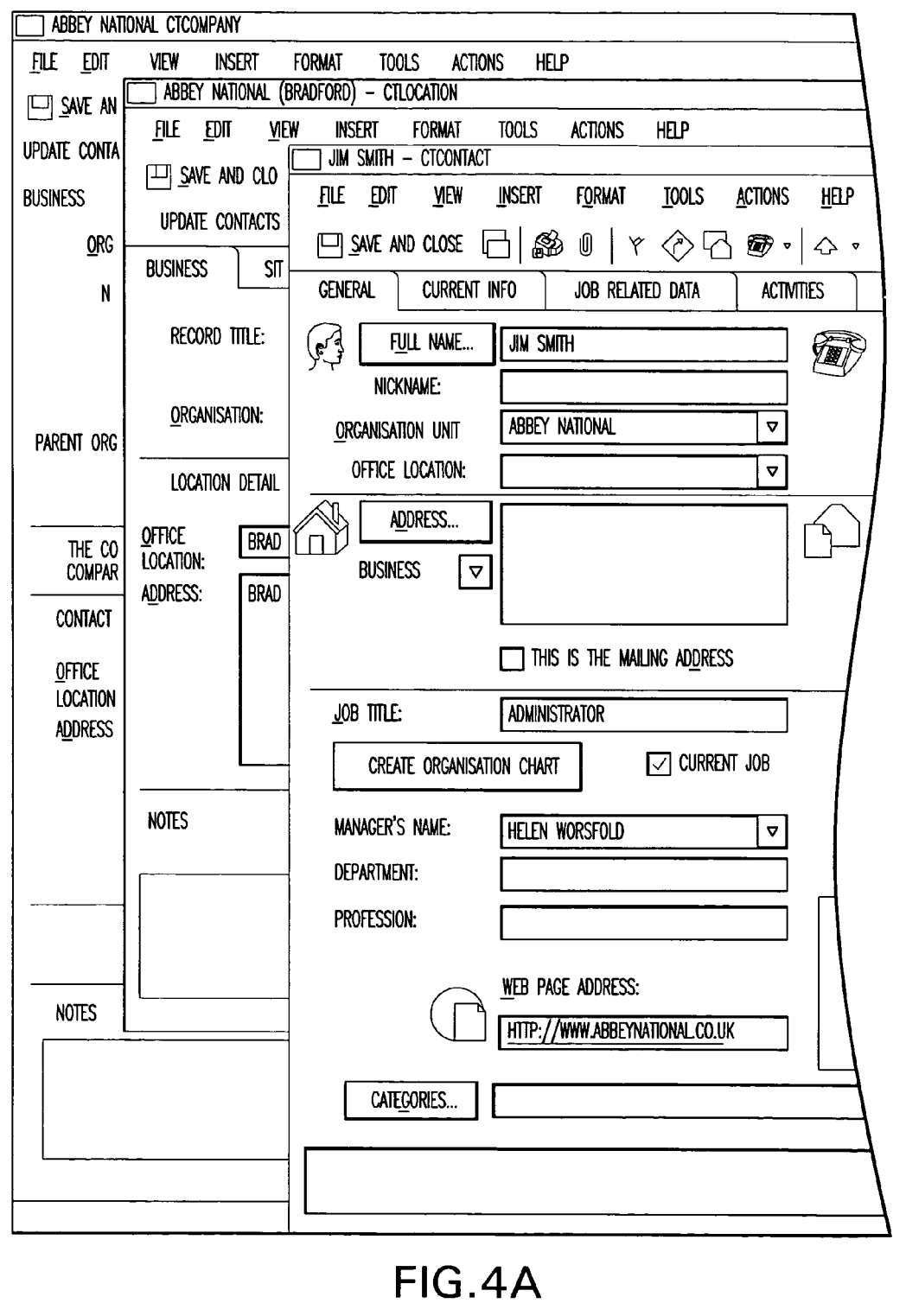

FIGS. 4A-4B illustrate forms that can be created by the present teachings in response to creation of a data record for a contact. Records containing contact information for the contact, for example, Jim Smith in window 402, a location record viewable for the organization in window 404, and an organization or company record window 406 can be created and/or updated in response to entry of a record for Jim Smith, by the Axelerator™ module and the Expo Axelerator™ module.

Figure 5A:
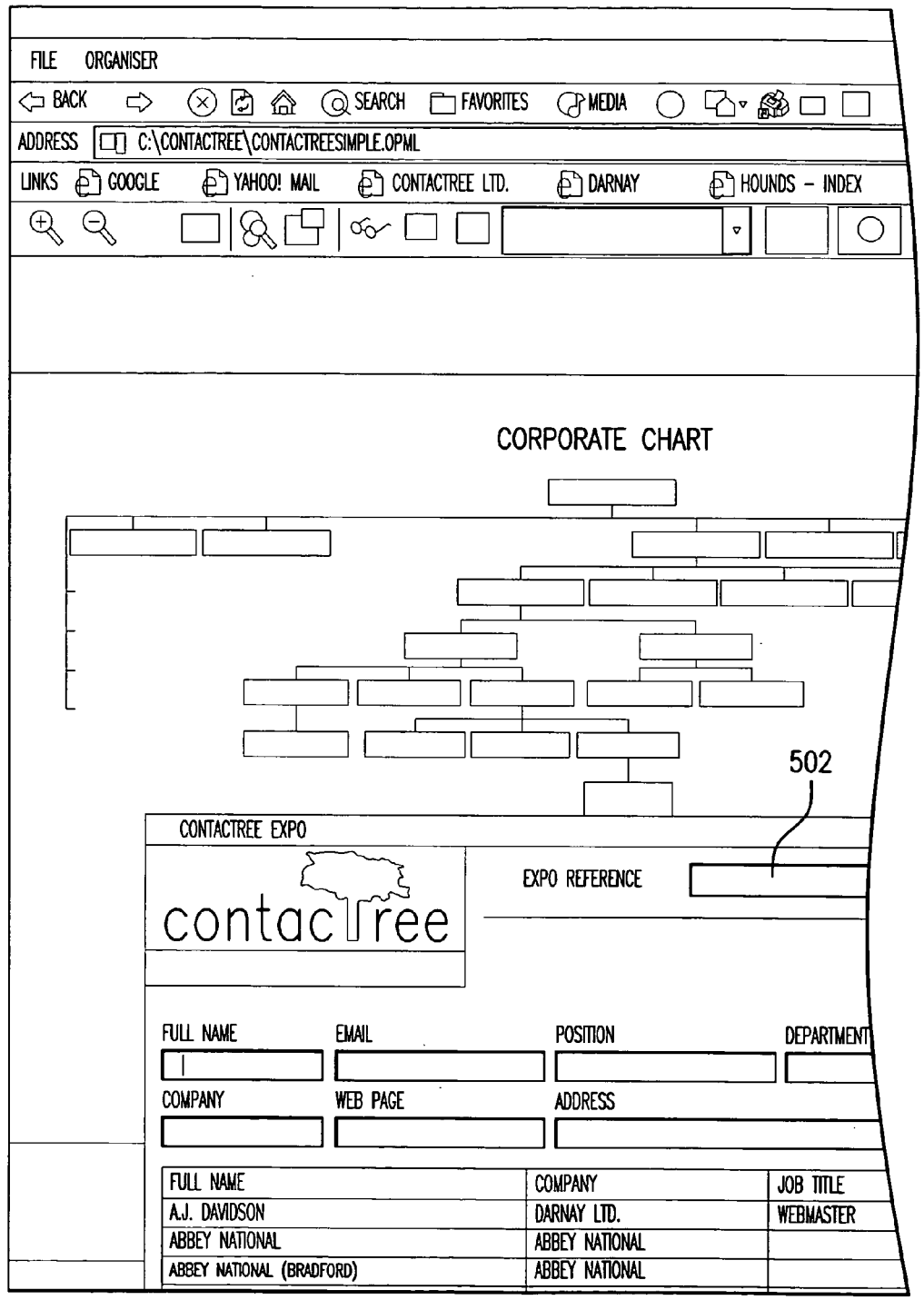

FIGS. 5A-5B illustrate an abbreviated input form that can be used to accelerate input of common fields, for example, contact referrer, contact date etc., for contacts made at an exposition, a show, or the like. The Expo Axelerator™ window 500 can be used to accept an identical value for the expo reference field 502, an expo date field 504, a company field 506, and a record locked field 508. Other fields 510 necessary to complete contact information can be available. All fields in the form can provide predictive input. FIGS. 5A-5B also illustrate a typical OrgChart that can be created.

All the records are values of different separate pieces of information for a contact. Fields having common values for a plurality of contacts, for example, supervisor, organization, organization location, can be shared and used by various contacts sharing common values for those fields. The splitting of these records allows for easy sharing of common values as future links and associations to the shared records. This sharing can reduce the time required to record the data. The sharing can increase the flexibility with which contact data can be used. For example, a company with a large number of employees can change its address without the need to individually change each single record. An organization can be characterized by several different location addresses. An organization can comprise a plurality of contact records.

The linking to shared records can be useful to organize contacts, for example, in a sales and marketing environment. The system can be used to organize networks of organizations or activities. This data structure can be useful to organize in groups a wide network of contacts, for example, members of trade associations, banks, retail and distribution enterprises, and the like.

The organization charts can be used in a variety of ways. For example, contacts in a group, such as a sales team, can have different relationships with various members of an organization. The detailed manner in which an organization chart can be variegated, for example, coloration, patterning, and line density, can signify the full range of relationships among contacts in the group. The variegation can vary according to a selection of a contact by a user, or as a perspective. The process can allow particular items or areas of charts to be selected and used to create links to the constituent elements of a subject data field.

In situations, where different users have knowledge of particular items of information, such as their business contacts, then each user can have a different perspective on that information. Indeed, each user can have a different level of certainty about his or her knowledge. The different level of certainty can derive from different points in time. These different views can be combined so that a single picture can be generated. The single picture can be generated using a mathematical process, for example, fuzzy logic to weigh different records for the same contact.

The fuzzy logic process can require values to be ascribed and stored with any data record by a user for each piece of information or record in the system. For example, user A can know contact Z extremely well, but not know what that contact does, whereas user B can know that Z is a very important person, but not know Z very well. Both pieces of information can be useful to a coordinator or manager, for example, when the manager needs to determine whether Z is important and/or known by a member of the manager's team. The manager can also determine whether the information of user B was entered into the knowledge-base at a particular recent time, or not.

The system can automatically ascribe a chronology to the information or data records that are entered. The mathematical algorithms to determine how much value should be ascribed to information of a particular date can use the chronology information. A user can derive and input different algorithms into the system. Combining these pieces of information can allow the user to select by varying criteria, for example, perhaps only the most recent information, or perhaps only data entered by the user.

To combine information having different subjective values can require each user to be given a facility to ascribe values to other pieces of information as the value records are entered into the database. The different subjective values can have many dimensions. One dimension can be time; other dimensions can include, for example, a) the certainty of the information, or b) the relevance or importance of the information. The user can record his or her evaluation of the contact data into input forms and/or fields. Input fields on a computer form can include a special box to record and enumerate a user's subjective value along different dimensions. The special box can accept a plurality of values, one for each dimension to be recorded. The plurality of values can be combined to form an array and stored as such. The special box can comprise, for example, a three box by three box array resembling the grid in a game of tick-tack-toe. The special box is referred to generically in this description as a "TickTac Box™".

Figure 6:
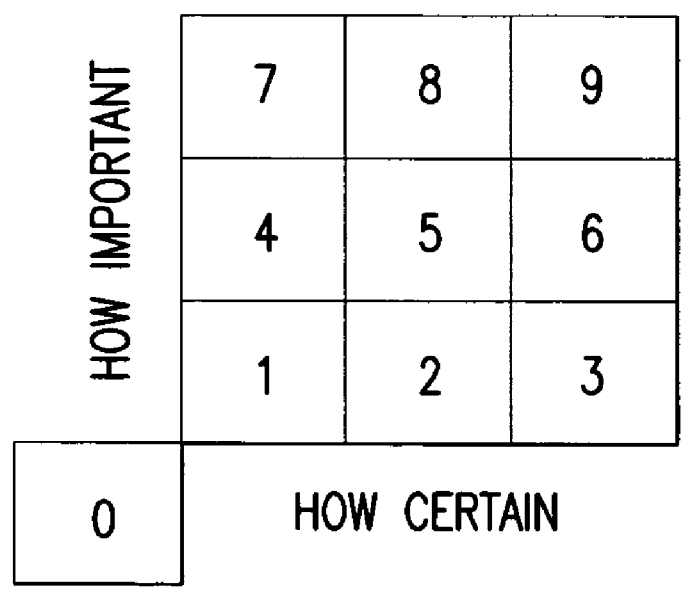
FIG. 6 is an example of a TickTac-Box™.

For example, as illustrated in FIG. 6, information that is known with total certainty and known to be of great value can have a check in the top right-hand box. Decreasing certainty, perhaps, would be entered in a lower row, decreasing value further to the left. These numerical values and the certainty information can then be used by a coordinator or manager to perform the mathematical calculations using the predetermined algorithms and hence to derive values for the chosen parameters. By such means he can, for example, conclude that most of his team believes that fact X, or contact X, is of paramount importance, and that the team has good knowledge of this information.

By generating hierarchic chart of the known facts or contacts, the coordinator can then use hyperlinks in an Organization Chart to access source information used for the creation of this perspective view.

Figure 7A:
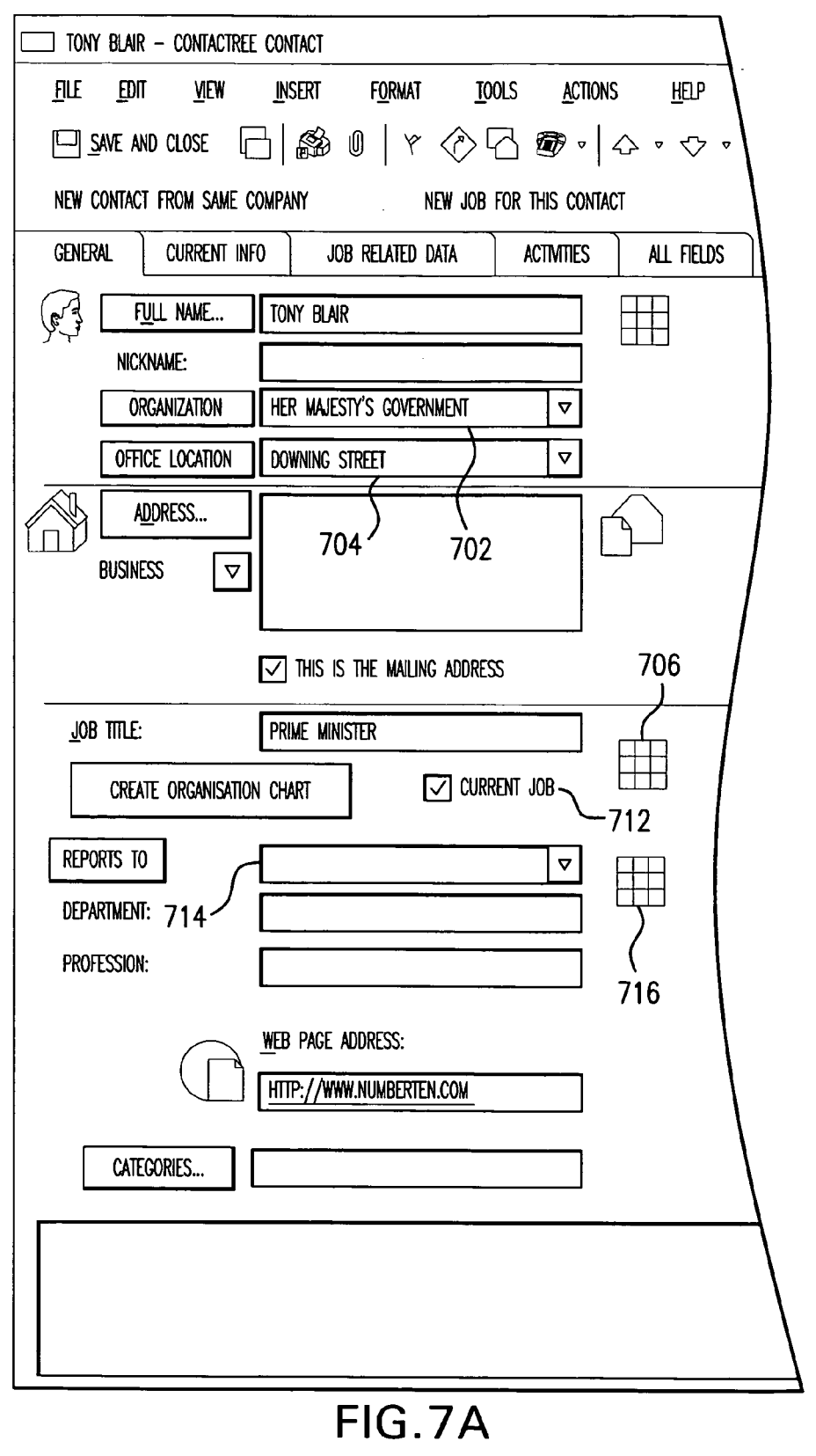

FIGS. 7A-7B illustrate an embodiment of displaying fields and TickTac-Box™ insert disposed adjacent to some fields. Window 700 can be an input form provided by a third-party software vendor. The window 700 can be augmented to accept input for fields used by the present teachings. The fields can include an organization field 702, an office location field 704, a job title multi-box field 706, a current job indicator field 712, a reports to field 714, a reports to multi-box field 716, an assistant field 718, an assistant multi-box field 720, a key contact field 722, a key contact multi-box field 724, and a photo file field 726. The window 700 can include a create organization chart button 710 that can be used to invoke the process hierarchical module or function. A quality assurance field can be any combination of the multi-box fields. A user subjective value field can be any combination of the multi-box fields.

Figure 8:
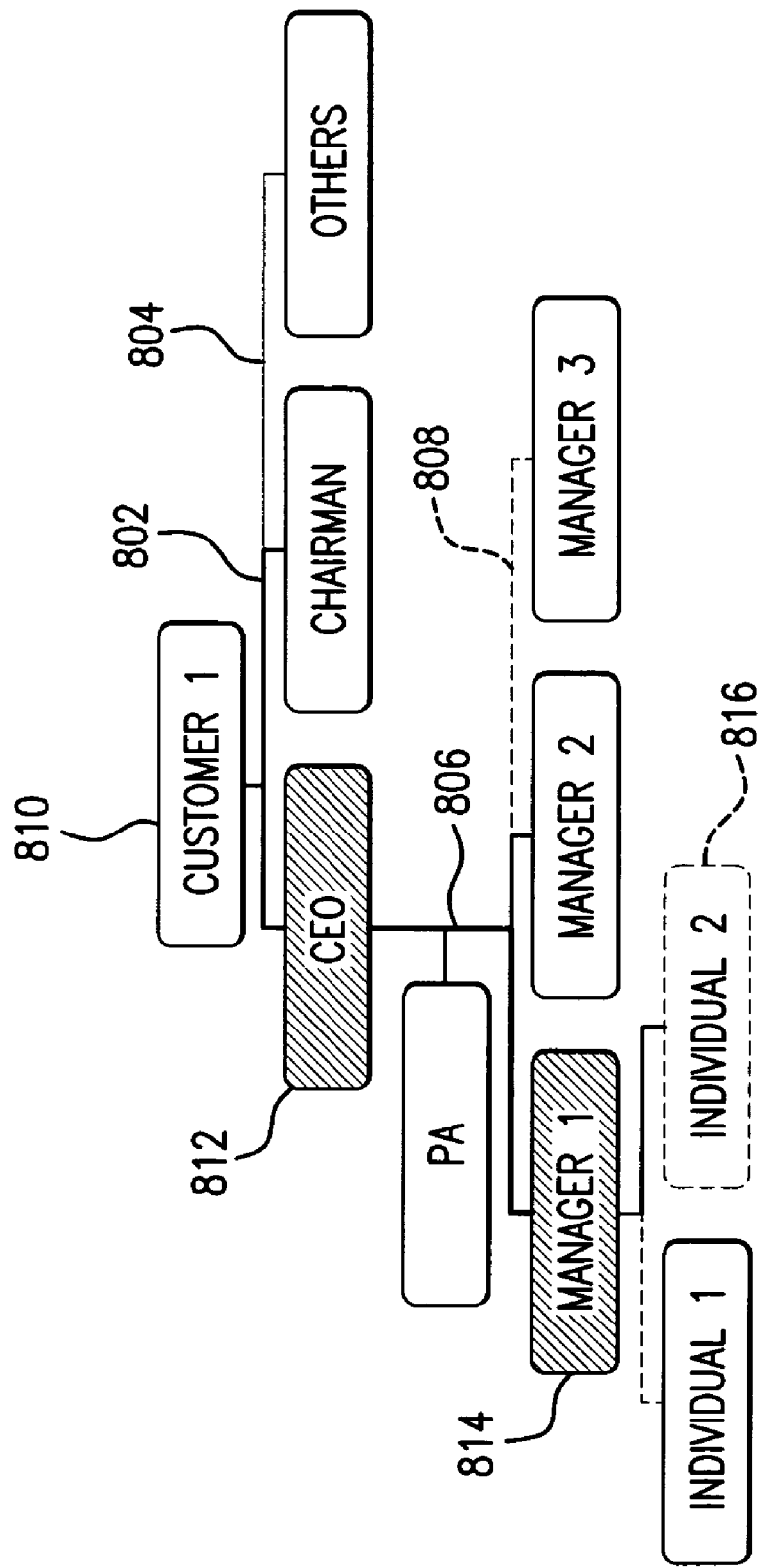
FIG. 8 is an exemplary organization chart illustrating relationships between a set of records and produced by methods of the teachings.

FIG. 8 is an exemplary organization chart illustrating relationships between a set of records and some graphical devices for classifying data. According to various embodiments, box fill patterns of colors can show significance differences. Connecting line attributes can show strength of a relationship. Box border line characteristics can show certainty of information. According to various embodiments, a line characteristic or a graphic attributes for each of the connector lines 802, 804, 806, and 808 can be derived from a value stored in the reports to multi-box field 716 of FIGS. 7A-7B, and can be visually intuitive to a user. For example, a broken line can signify a weak relationship and a thickness of the line can signify the strength of the relationship. In various embodiments, a box fill characteristic or a graphic attribute for each of the boxes 810, 812, and 814 can be derived from a value stored in the key contacts multi-box field 724 of FIGS. 7A-7B, and can be visually intuitive to a user. For example, a fill pattern of the box 812 can identify a decision maker, and a fill pattern of the box 814 can identify a key contact. In various embodiments, a box border line characteristic or graphic attributes for each of boxes 810, and 816 can be derived from a value stored in the current job indicator field 712 of FIGS. 7A-7B, and can be visually intuitive to a user. For example, a fill pattern of the box 816 can identify a ghost record or someone who has left the job.

The system can be implemented using a general purpose computer. The computer can comprise a central processor, a keyboard for data entry, a screen for the display of information presented at particular points on the screen. The screen can display a hyperlink or a link in a document or chart to associate or connect to information within the document or in another document. Highlighting a word or image, for example, can represent these links. When a user selects a hyperlink, the computer displays the associated document, or a portion of the document referenced by the hyperlink. Various data entry methods known in the art for use with portable or personal devices can be used. These data entry methods can use touch-screens. One particular embodiment can use a personal digital assistant or a mobile telephone to enter, share, and display contact information.

Software modules for implementing data input forms can be provided. The forms can include at least one icon able to access multi-box arrays, for example a TickTac-Box™, that can be used to record a multi-dimensional value. The value can be a subjective value that a user places on an input data fact. The icon can be placed adjacent to a descriptive field or text. The multi-box array can combine any number of boxes and dimensions; for example, a two-dimensional value can be entered using a sequence sub-divided into nine boxes. The boxes can occupy an equal area on a display. The boxes can occupy unequal areas on the display.

Modules

An input form module can contain a number of routines that can significantly reduce effort and time necessary to input conventional contact fields or other fields in a database system. The input process can invite the user to supply information about other contacts and/or activities that can be related, closely or peripherally, in an organization whose contact information is being populated.

An output display module can arrange information in a graphical network display. The information can be contact information. The graphical network display can be a branched organization chart. The chart can include hyperlinks. Text fields, boxes, connecting lines, or a combination thereof can be hyperlinks. These hyperlinks can be called inherent hyperlinks. Hyperlinks enable details for selected items, such as, individual contacts within the chart to be displayed on the screen. A user knowing one contact with an organization can use the charting ability to generate a display of a desired organization. The user can thus gain insight or knowledge about names and relationships of other members of the desired organization. The graphical image can allow the user to select, view, and edit the information on another relevant contact, even though the user could previously have been ignorant of the name or the function of the relevant contact.

A database module, provided separately or as an integrated facility can retain the information, and data records can be entered through an input module, for example, Axelerator™. The database can be any personal or proprietary system, for example, Microsoft Outlook, to which the input module can be adapted.

An export module can prepare a data file in a convenient standard protocol, for example, comma separated values (CSV), extended Markup Language (XML), to enable data records to be exported. The records can be sorted using a desired key. The output display module can display the exported data file.

A centralized database can be used to allow the data records from individual databases maintained by a plurality of users to be combined and integrated. This can facilitate creation of subject organization charts to display the full nature of all the relationships that the multiple users, for example, sales persons, working as a user team can have with the range of their various contacts.

Data integration and weight calculation modules that can be used in a variety of user-definable ways to combine enumerated values attached to a data record by multiple members of the user team can present a single resultant picture. This module can allow layers of the resultant picture to be peeled away, or off an organization chart to reveal individual data sets hidden by the layers.

Input Axelerator™

When one of these active functions is selected it can open up a form that invites the input of a piece of data that is to be filed, or to be used to search for information previously entered into the system.

These forms, called Accelerators Axelerator™ because of the increased speed of data entry that they allow, can be re-configured by a user in a way that best suits the users personal use. The forms can include functionally-critical input fields, for example, a) a name;
    b) any special identifier, such as an associated sales opportunity;
    c) a name of an affiliate organization;
    d) an electronic mail address (if known);
    e) other useful attributes such as a telephone number;
    f) a name of an affiliation or connection at an upwards level, next in command or any number of levels upwards, in the organization, such as a supervisor;
    g) place of meeting or person who made the introduction; and
    h) individual having a key relationship with this contact.

These boxes can be addressed in any order either by indexing from a keyboard or by the positioning of a pointing device such as a mouse. As soon as any characters are entered into the box or field, the input form modules can commence a search in an appropriate field of the database to look for existing data records, at least partially initiating the field data being entered.

Data such as electronic mail addresses can be predicted from a formula deduced from previous entries from the same organization. Other data fields such as the creation timestamp of the record, a last modified timestamp, and other pre-set data, such as an event or location, can be automatically entered by the input form module.

Creation of Records

The creation of records can be illustrated using FIGS. 3A-3B, as an example. Data field values provided for a contact can be sufficient to create unique records in a database. The following linked pieces of information or data records can be created:

a) a record for the individual entity or contact and a specific local address;
    b) a record for the organization to which the contact belongs to and the organization's address.;
    c) a generic location record that allows the recording of geographically-separate groups for the organization;
    d) a unique record for an activity or sales opportunity that can be mostly blank except for an identify value to associate the record with the contact;
    e) a record for the referring contact;
    f) a record for the affiliation of the referrer; and
    g) a record for the name of the supervisor, manager, or parent entity.

While none of these records may be complete records in the first instance, they can be sufficient to be elaborated upon as a relationship with the contact develops. The loaded records can serve to be a sufficiently comprehensive record of the encounter.

Elaboration of linked records can presently or subsequently provide values to various fields. The elaboration can include subjective information describing the relationship.

The relationship can take many forms, for example, the relationship can be between the user and his contact; between the user's contact and the user's supervisor; between the contact and the user's organization; the contact and the contact's organization. The relationship can include the degree of importance that each relationship can have within a commercial organization or other inter-organization relationship. A manager/worker relationship can be a single occurrence of that type of relationship. A special case can exist where the worker is also known to be an Assistant. The special relationship can result in different formatting in the standard graphical output. A contact can have many records. The different records can be used to manage a subordinate contact working for many supervisors; the different records can for example relate the hierarchy placement of a contact at the same time in different roles. According to various embodiments, the organization chart can visually relate a situation of a line/project manager also functioning as a Function manager. These two relationships can be explicitly recorded for any given instance of a person/role.

Attributes or elements of the chart can be used to visualize relationships. These attributes include but are not limited to color of the text for a contact name; color of the box background that includes the contact; color and density of the box wall that contains the name; the color or pattern, such as a photograph of the relevant contact, of the background to the chart; and the color and density of the lines that link contacts within a chart. FIG. 8 is an example of this highlight.

Such combination attributes can provide a wide range of visual cues, expressing the variety of the relationships between groups of contacts. Conventional multi-user contact databases seek in the main to create a single uniform list of contacts by taking the lowest common denominator of relevant information. According to various embodiments, the teachings herein use a subjective process to enable the wide range of relationship to be represented in a two-dimensional manner or chart. The teachings include providing an ability to select and display expanded or exploding view elements of data defining the relationships. The traversal of linked records define a relationship can facilitate this.

Open Mailbox

The open mailbox module or e-mail accelerator can mirror conventional functionality for managing e-mail. Additionally, upon receiving an in-coming e-mail, the open mailbox module can be used to pick up an e-mail address of the originator of the document, and of any visible addressed contacts, i.e., every addressee except contacts listed as blind carbon-copy (BCC).

The e-mail Accelerator can look at each of these addresses and attempts to match them with already known contacts in the contact database. If it achieves an apparent match of address or address template, the e-mail Accelerator can offer the match as a proposition to the user. If no match is achieved, the nearest match for checking or for amendment can be offered. This can enable the user to create, for future reference, records of all contacts involved in activity relevant to him. The software can use the e-mail address to infer the best-guess data to enter into the new contact records, thus greatly saving on time needed to perform these functions.

The software can invite the user to attach to the communication a project/opportunity reference, or tag, which can be stored with all records for future use.

Enterprise Organization

The software allows companies, divisions of companies, and other recognizable group entities to be displayed hierarchically under formal holding-company architecture. The software can be used for less formal structures such as Trade Associations, or even Market sectors. These groups are not created by sorting the records into tightly-defined pigeon-holes, but by creating links to the master records wherever they can be filed.

These features allow not just structured reports to be generated, they also allow unstructured key-word searches to be undertaken and this can form the basis for a knowledge-based information collection and retrieval system.

Report Accelerator

The user can generate documents describing the activities of groups of contacts, perhaps from a project meeting, or encountered at an event. A report accelerator can provide a pro-forma that can be used to create any document such as visit reports, meeting minutes etc, in which are provided standard tables for entering the names of the attendees and their attributes.

In this case the input form module assists in the creation of this input information from the contact database, while on the other hand the report accelerator uses the input form module or Axelerator™ to create new records for contacts not in the database.

Organization Charting

The purpose of the output organization charting routines can be to enable a user to rapidly appreciate the relationships that govern the behavior of his target contacts and organizations. This assists in marketing decisions such as identifying the key influencers and decision-makers on any particular activity.

As an illustration: the name of a contact can be typed into a 'search for contact' box. If identified, the software can auto-complete the entry. The user can then place his pointing device over one of the Org Charting boxes displayed on the opening menu screen. If the Company Org Chart is pressed or selected, then the relationships of the contact's native company and the company's subsidiaries can be displayed. Axelerator™ input facilities can be available to populate data sets not previously entered.

For example: a box of information that was coded red can be deemed most significant; selecting the red box can generate and display another chart showing all the contacts who know the selected contact in the red box. Subsequently selected a box of one of the contacts who knows the selected contact in the red box can show that subsequently selected contact's view of the organization chart with the first selected contact embedded in the second organization chart. That chart itself can be graphically coded to show the values that a user had ascribed to the relationship in the TickTac-Box™ boxes.

Pressing or selecting the appropriate Org Chart button can invoke the process organization chart module to display the organization of any project with which the contact is known to be associated using the acquired information of all the upwards relationships within the organization. When desired, a user can select a node of the organization chart to display the underlying record.

In a situation where the name of an organization or the affiliation of a contact is amended, a ghost record recording each version of the contact record can be created. Ghost records can displayed or not in an organization chart, as desired. Ghost records can preserve history of past employment. This can be often useful for research purposes.

Each contact "instance" has a unique-id generated. This unique-id can be used to map and traverse relationship trees. A contact type does matter as formatting is applied differently to Company/Organization, Location, Person (and special case Assistant) and whether the record is "live" or not. According to various embodiments, a hierarchical chart is built upwards from a selected contact by finding his parent organization, and then forming the hierarchical chart downwards from there. Where the selected contact is for a Company/Organization record, the process finds a parent Organization for the selected contact and works down from there through all subsidiary organizations/contacts.

In a multi-user application the charts can be used, for example, to display the relationships between a number of members of a user team and each single contact with whom they are acquainted. Using the color and texture features in the process, the differing nature of these relationships can be visualized, and then selected for further presentation in a wide variety of ways.

Each user of a multi-user system can have different information about, and a different view of, any one individual contact. A means can be provided for a user to assign to any key data field in the data entry form or Axelerator™ a set of coded descriptors or 'enumerators'. These enumerators can, for example, indicate how well the user knows the contact, or how important the user believes such a contact could be to his group of users or company. Information collected may not always be truly factual, but can be the result of opinion or of more-or-less imprecise estimation. In such a case, the value the group can attach to the enumerator information can reflect the reliability of the information accordingly. The recentness of the information as recorded or checked can vary from user to user, in which case the composite view available to the group can give different levels of credence to later rather than earlier information.

The processes used to assign enumerator values and to combine the different sets of data are sometimes called fuzzy logic, as they deal with imprecision and uncertainties. Nonetheless they contain valuable information that can all be weighed together to produce a group view. According to various embodiments, a process can use a variety of combination algorithms or mathematical and deductive processes to arrive at one single group view of the overall value of the individual enumerators. Such a view can be modified by changing the assumptions used in arriving at that view, for example, the weighting that can be given to the time that has elapsed since any one piece of information was recorded.

The group combined view can be presented as a single Org Chart in which the colors of the elements in the chart can be used to indicate the different group values as seen for example in FIG. 7. For example, the contact that is best known by the group can have one graphical characteristic or color, while the contact believed to be the most important to the group under specified circumstances, can have a different color or graphical characteristic. Likewise lines linking contacts together or the frame of the boxes containing contacts can have different densities or be broken according to the degree of certainty attaching to the knowledge about that connection or that assignment. These are but examples of the many different graphical devices that can be used to distinguish and recognize information in different classes or gradations.

Agglomeration rules can define the single "best" view of any organization. The originating data can be unaffected. Once a contact has been selected, a "drill down" organization chart to see a contact (or team) view of the prospect can be formed. Formatting styles for boxes and links can be defined to illustrate various features of interest in the chart, such as recency of contact etc. As a simple example of an agglomeration rule: if A thinks that X works for Y, but is not sure; and then B thinks that X works for Y, then the probability that this is true has increased.

Implicit in such a display chart is indicative information that can be examined in greater detail by clicking on a box in the chart to reveal further layers of information behind it. Such layers could include, but not be limited to, the contact in the group who has the best knowledge about that particular facet of the organization or contact within it. Such information can be used to facilitate communication between members of the user group and the contact organization. Ergonomic studies determine the graphical devices that each user prefers in his specific circumstances, and the software provides for this to be selected and set by the user.

Other methods of determining the best lines of communication can invoke relationship information that can be collected by means of social network analysis in which the statistical frequency and the number of links required to make a particular connection can analyzed.

TickTac-Box™

In practical terms the method of recording the assigned enumerator value of the subject contact must be very simple and easy to use. One way in which this has been successfully applied is for any data field of importance to be assigned, at the requirements of the user, its own enumerator data box. This box can be conveniently formed as a nest of cells which in a three-by-three example looks like a 'noughts and crosses' or 'tic-tac-toe' matrix, and is referred to generically herein as a TickTac-Box™, see FIG. 6. The purpose of the TickTac-Box™ can be that the user has a number of cells, in this case (but not exclusively) nine, which can be modified or ticked with a mouse-click, or by indexing the keyboard, according to the enumeration value that the user subjectively or objectively assigns to the information he/she enters in the adjacent data field, for example, as illustrated in FIGS. 7A-7B.

The cells in the TickTac-Box™ can be labeled by rows and columns, e.g. R(ow)1-C(olumn)1 to R3-C3 as well as by cell number where R3-C3=cell 9, then a range of options for encoding the chart can be envisioned.

In a simple scheme the background in a box in the chart can be filled by a color, texture, pattern, shading or hatching as in FIG. 8. The highest value (9) could be represented by red and, following the colors of the rainbow, the lowest by blue. A value of 5 (R2-C2) therefore could possibly be represented by green. Gradations and shading can be used where fractional values are calculated.

It can be possible to indicate on the chart the level of certainty, for example, by varying the density of the line that defines the boundaries of a name box. Column 3 values can have the densest lines or connectors, and column 1 the least. Different row values can be represented by the line color. These combinations of coding could be varied to suit particular situations. Some typical examples in which shading rather than coloring can be used are shown in FIG. 8.

For multi-user team situations the values can be combined in a variety of simple or complex ways. For example, two users who know a particular contact, but to different degrees could ascribe various values of R1-C1 (1) and R3-C3 (9) to the information recorded by each. A simple arithmetic combination of these enumerators would derive an average team value of R2-C2 (5) for the information. This would be represented on the chart by the colors (green) and densities appropriate to these values.

Indication of the time elapsed since the recording of the information can be shown by fading the fill of the box, for example, but time can be included in the calculation of best value and used to weight different opinions according to relative age. The time information can be registered automatically by the computer when the data is recorded.

By these various means it becomes possible to convey on a single branched chart the combined knowledge of a number of users of the system. It is not difficult to envision how an almost infinite range of combinations can be selected by giving the user a set of configuration menus on the computer screen.

Each group of users can set its own rules for the meanings of checking each enumerator cell, and these rules can be set up in a way whereby they appear in a 'drop-down box' when the user gets ready to choose the values to be entered.

In combining the information from a group of users the calculation could, for example, calculate the frequency with which a particular value appears, but common arithmetic combinations such as average, mean and mode would be typical examples of the process.

This data valuation process can be applicable to any Knowledge-Management system where there can be a subjective quality to the information recorded, regardless of whether this is intended for graphical display in a hierarchic chart.

Integration with Third-Party Software

Outlook's API is included with every copy of Outlook, as is the ability to write code in VBA via the built-in VBA editor (ALT-F11 if you want to see it for yourself) or in VB.Net or similar. To learn how to make best use of Outlook, there are a number of commercial books on the topic, for example, Microsoft Outlook Programming, Jumpstart for Administrators, Developers, and Power Users by Sue Mosher and Programming Microsoft Outlook and Microsoft Exchange 2003, Third Edition by Thomas Rizzo. Sample code and articles on the topic of programming Outlook can be located on the web at msdn.microsoft.com/office/understanding/outlook/default.aspx, www.slipstick.com, or www.outlookcode.com.

These third party software products can and do provide unique key or id management as a built-in feature of their data record management. Unique key management can be provided when record management is provided by a conventional database.

In conjunction with MS Outlook, MS Exchange or MS SharePoint Server can be used as the means of sharing data. A SQL compliant database can be used to provide data store or database used to store and retrieve the various types of records. Any Open Source and Commercial alternatives that would produce similar functionality can be integrated with the teachings of the present application.

ContacTree™ available from ContacTree Limited a UK company, implements the teachings of the present application. ContacTree™ is an easy-to-use Organizer that can turn MS Outlook from an e-mail tool into a mission-critical knowledge management application. A help guide for ContacTree™ is available at www.contactree.com.

Key Elements

1. A contact management system in which a linked relationship between contacts and their organizations and locations encourages the collection by the user of large amounts of information of unknown quality that improves automatically as the number of records collected increases.
2. The process of building up organization charts from contact/manager pairs.
3. The use of the chart display to hyperlink to the records of the contacts in the chart.
4. The ability to create linked charts for groups of the organizations to which the contacts belong.
5. The use of graphical and stylistic attributes and devices (e.g. colors) to display relevant classifications of contacts and organizations.
6. Graphical display in which the views of a number of contacts may be combined.
7. Ability to use hyperlinks to drill-down to reveal the views of each contact.
8. A graphical device (an array of input boxes) to encode the subjective value assigned by a contact user to any piece of information to be recorded.
9. The use of these subjective values to compute, through a variety of user-defined algorithms, a range of combined views of the team.
10. The use of key entry dates for the records to be viewed in time-sensitive ways, for example, all records later than a certain date, or weighted in the calculations according to age.
11. The combination with statistical network processes such as Social Network Analysis.
12. The use of these processes for Knowledge-Management fields other than Contact Management.

Other embodiments of the present teachings will be apparent to those skilled in the art from consideration of the present specification and practice of the present teachings disclosed herein. It is intended that the present specification and examples be considered as exemplary only with a true scope and spirit of the teachings being indicated by the following claims and equivalents thereof.

What is claimed is:

1. A method comprising:
providing a computer comprising a processing device, a display device, a storage device, and a data store;
storing a plurality of contact data records from one or more contacts in the data store, each contact data record comprising at least one contact field for storing contact information about a contact and a relationship field for storing relationship information about the contact, wherein for at least one of the contact data records the relationship field defines a hierarchical relationship with at least one of the other contact data records, each contact field comprises a first quality assurance field that comprises a user-defined multi-dimensional subjective value that represents both a level of certainty and a level of importance of the contact information stored in the respective contact field, and each relationship field comprises a second quality assurance field that comprises a user-defined multi-dimensional subjective value that represents both a level of certainty and a level of importance of the relationship information stored in the relationship field;
determining that at least two of the plurality of contact data records represent the same contact;
processing the at least two contact data records that represent the same contact to determine a processed contact data record for the contact by combining the respective multi-dimensional subjective values of the first quality assurance field of each contact data record against each other using a mathematical process, and by combining the respective multi-dimensional subjective values of the second quality assurance field of each contact data record against each other using a mathematical process:

forming a hierarchical chart using at least one of the plurality of contact data records such that the hierarchical chart is based on the relationship fields of the contact data records; and outputting a display of the hierarchical chart to the display device, wherein the display comprises a plurality of boxes and connectors between the boxes such that each box comprises contact information and such that the connectors display the hierarchy of the boxes, the hierarchy of the boxes is determined by the relationship fields of the contact data records, and the method further comprises defining a graphical attribute that is a graphical representation of at least one of the boxes based on at least one of the first quality assurance field and the second quality assurance field of the contact data record associated with the box.

2. The method of claim 1, further comprising selecting one or more contact data records from the plurality of contact data records wherein at least one of the respective first quality assurance field and the second quality assurance field for each selected contact data record meet a desired criterion.

3. The method of claim 1, wherein at least one of the first quality assurance field and the second quality assurance field further comprises a data record modification timestamp.

4. The method of claim 1, wherein the relationship field records a relationship between at least one of a contact and a supervisor of the contact and a contact, and a subordinate of the contact.

5. The method of claim 1, wherein the display of the hierarchical chart further comprises a display of the respective contact data record on the display device in response to a user selection of any one of the boxes.

6. The method of claim 1, wherein the graphical attribute is designed to visually impart a level of certainty of the respective contact data record.

7. The method of claim 1, wherein the graphical attribute further comprises a representation of at least one of the one or more connectors based on at least one of the respective first quality assurance field and the second quality assurance field of the respective contact data record, to visually impart a level of certainty of the respective contact data record.

8. The method of claim 1, wherein the relationship field records a relationship between a primary designation and a secondary designation.

9. The method of claim 1, further comprising selecting a contact data record from the plurality of contact data records and the processing the at least two contact data records comprises traversing the relationship field of each contact data record to compute hierarchy above and below the selected contact data record.

10. The method of claim 1, further comprising highlighting a selected contact data record in the hierarchical chart in order to connect with associated data.

11. The method of claim 1, further comprising performing a contact network analysis on the plurality of contact data records based on a value of the respective relationship field of each contact data record.

12. The method of claim 1, wherein the computer further comprises an input device and each contact data record comprises a plurality of contact fields for storing contact information about a contact, and the method further comprises inputting a value for one contact field of the plurality of contact fields, and predicting values for at least one other contact field of the plurality of contact fields, based on the value of the one contact field.

13. The method of claim 1, wherein the computer further comprises a printer, and the method further comprises printing the hierarchical chart using the printer.

14. The method of claim 1, wherein the attribute is defined to visually impart a level of importance of the respective contact data record.

15. The method of claim 1, further comprising defining an attribute that is a graphical representation of at least one of the one or more connectors, to visually impart a level of importance of the respective contact data record.

16. A computer-readable medium having stored thereon a computer program, the computer program comprising:

a data store manager adapted to manage a plurality of contact data records from one or more contacts, each contact data record including a plurality of contact fields for storing contact information about a contact and a relationship field for storing relationship information about the contact, wherein for at least one of the contact data records the relationship field defines a hierarchical relationship with at least one other contact data record, each contact field comprises a first quality assurance field comprising a user-defined multi-dimensional subjective value that represents a level of certainty and a level of importance of the contact information stored in the respective contact field, the relationship field comprises a second quality assurance field comprising a user-defined multi-dimensional subjective value that represents a level of certainty and a level of importance of the relationship information stored in the relationship field, and at least two of the contact data records represent the same contact;

a hierarchical chart processing module configured to process the at least two contact data records that represent the same contact, and configured to form a hierarchical chart that reflects the relationship between each of the contact data records, and configured to define a graphical attribute, wherein the module is configured to process the at least two contact data records from the same contact to form a processed contact data record for the contact by combining the respective multi-dimensional subjective values of the first quality assurance field of each contact record against each other using a mathematical process, and by combining the respective multi-dimensional subjective values of the second quality assurance field of each contact data record against each other using a mathematical process, the hierarchical chart is based upon the relationship fields of the respective contact data records, the hierarchical chart comprises boxes and one or more connectors, each box comprising contact information for a particular contact and the one or more connectors configured to display a hierarchy of the boxes, and the graphical attribute is a graphical representation of at least one of the boxes based on at least one of the first quality assurance field and the second quality assurance field of the contact data record associated with the box;

a display module configured to output a display of the hierarchical chart on a display device; and an input module adapted to accept a value for one contact field of the plurality of contact fields, and predict values for one or more of other contact fields of the plurality of contact fields based on the value of the one contact field.

17. A system comprising:
a computer comprising a processing device, a display device, a storage device, and an input device;
a database manager adapted to store a plurality of contact data records from one or more contacts on the storage device, each contact data record including a plurality of fields for storing contact information about a contact, and a relationship field for storing relationship information about the contact, wherein for at least one of the contact data records, the relationship field defines a hierarchical relationship with at least one other contact data records, each contact field comprises a first quality assurance field that comprises a user-defined multi-dimensional subjective value that represents a level of certainty and a level of importance of the contact information stored within that respective contact field, the relationship field comprises a second quality assurance field that comprises a user-defined multi-dimensional subjective value that represents a level of certainty and a level of importance of the contact information stored within that respective relationship field, and at least two of the contact data records represent the same contact; and
a contact manager comprising
  a hierarchical chart processing module configured to process the at least two contact data records that represent the same contact, and configured to form a hierarchical chart that reflects the relationship between each of the contact data records, and configured to define an attribute, wherein the module is configured to process the at least two contact data records that represent the same contact to form a processed contact data record for that contact by both combining the respective multi-dimensional subjective values of the first quality assurance field of each contact data record against each other using a mathematical process, and by combining the respective multi-dimensional subjective values of the second quality assurance field of each contact data record against each other using a mathematical process, the hierarchical chart is based upon the relationship fields of the respective contact data records, the hierarchical chart comprises boxes and one or more connectors, each box comprising contact information for a particular contact and the one or more connectors configured to display a hierarchy of the boxes, and the attribute is a graphical representation of at least one of the boxes based on at least one of the first quality assurance field and the second quality assurance field of the contact data record associated with the box,
  a display module configured to output a display of the hierarchical chart on the display device, and
  an input module adapted to accept a value for a first contact field of the plurality of contact fields, and predict values for one or more other contact fields of the plurality of contact fields, based on the value of the first contact field.

18. The system of claim 17, further comprising a personal digital assistant or a mobile telephone as an input or display device.

19. The system of claim 17, further comprising a printer capable of printing the hierarchical chart.

* * * * *